United States Patent
Squirrell

[11] Patent Number: 5,542,684
[45] Date of Patent: Aug. 6, 1996

[54] CANTILEVER SPRING SEALS FOR GAS ISOLATORS

[75] Inventor: Anton F. Squirrell, Mellingen, Switzerland

[73] Assignee: WES Technology Inc., Santa Ana, Calif.

[21] Appl. No.: 256,811

[22] PCT Filed: Jan. 27, 1993

[86] PCT No.: PCT/GB93/00170

§ 371 Date: Sep. 1, 1994

§ 102(e) Date: Sep. 1, 1994

[87] PCT Pub. No.: WO93/15342

PCT Pub. Date: Aug. 5, 1993

[30] Foreign Application Priority Data

Jan. 28, 1992 [GB] United Kingdom ............ 92017623

[51] Int. Cl.[6] .................................................. F16K 11/14
[52] U.S. Cl. ........................ 277/236; 251/174; 251/176; 251/177
[58] Field of Search ........................ 277/236, 12, 159; 137/856, 601, 857; 251/176, 174, 177, 902

[56] References Cited

U.S. PATENT DOCUMENTS

| | | | |
|---|---|---|---|
| 3,698,429 | 10/1972 | Lowe et al. | 137/601 |
| 4,325,411 | 4/1982 | Squirrell | 277/193 |
| 4,383,693 | 5/1983 | Heller | 277/236 |
| 4,575,099 | 3/1986 | Nash | 277/12 |
| 4,823,836 | 4/1989 | Bachmann et al. | 137/601 |
| 5,099,886 | 3/1992 | Squirrell | 137/856 |
| 5,120,021 | 6/1992 | Squirrell et al. | 251/298 |

FOREIGN PATENT DOCUMENTS

| | | |
|---|---|---|
| 2558917 | 1/1985 | France . |
| 1308801 | 3/1973 | United Kingdom . |
| 2060824 | 5/1981 | United Kingdom . |
| 9002279 | 3/1990 | WIPO . |
| 9006460 | 6/1990 | WIPO . |

*Primary Examiner*—Daniel G. DePumpo
*Attorney, Agent, or Firm*—Norbert P. Holler; Gottlieb, Rackman & Reisman, P.C.

[57] ABSTRACT

A seal for a gas isolator comprises a cantilever leaf spring (1) attached to a fixed frame or a movable member (2) of the isolator, and a bias spring (3) acting on the leaf spring, and a bar (4) disposed below the seal for clamping and supporting the latter, characterized by at least one additional damping element which will usually comprise a further leaf spring (7), and characterized in that the clamping/support bar (4) is of reduced width.

7 Claims, 2 Drawing Sheets

CANTILEVER SPRING SEALS FOR GAS ISOLATORS

This invention relates to seals for gas isolators, and in particular to high expansion tolerance seals for large gas isolators where large amounts of differential expansion have to be accommodated between certain components of the isolator, namely, the movable closure member (the blade) and the fixed frame (the casing).

The increasing size of gas turbines is creating a need for larger isolating equipment. One of the main problems which confronts the designer of such equipment is that of the differential expansion which occurs between the fixed frame and the moving blade member. The amount of expansion depends on the size, the maximum temperature differential and the materials of construction. For example, on a diverter valve 5.5 m square the differential expansion can be as much as 65 mm.

In addition, modern gas turbines have very high exhaust velocities, mean values of 80–100 m/s being common. Unless the design of the exhaust ducting has been executed using good aerodynamic design principles, flow separation and high fluctuating dynamic pressures can result. The frequencies of the fluctuating pressures can exist over a wide range of values up to as much as 50 hz. Seals for gas isolators located in these systems must be designed so that they will not be excited by forcing frequencies in the system up to say 60 hz. Attention to resistance to flutter is therefore of paramount importance.

In the prior art (GB-1308801 & GB-2060824) the amount of differential expansion which can be accommodated is limited by the width of the clamping/support bar under the seal. This bar has the dual function of clamping the seal to the blade or frame member and to prevent flutter of the seal when it is in the non-sealing position.

GB-1308801 describes a seal for a gas isolator which comprises a cantilever leaf spring to be attached to a fixed frame or a movable member of the isolator, and a bias spring acting on the leaf spring to tension the leaf spring so as to curve the latter when the seal is not in the sealing position, the bias spring being itself tensioned to press the leaf spring flat against a seating when the seal is in the sealing position.

An alternative form of seal is described in GB-2060824 which provides a seal for a gas isolator which comprises a cantilever leaf spring to be attached to a fixed frame or a movable member of the isolator, and a bias spring acting on the leaf spring, wherein the leaf spring is bent or curved when unstressed and wherein in the non-sealing position of the seal the bias spring makes only touch contact with the leaf spring, so that the leaf spring is unstressed in the said non-sealing position, whereby in the sealing position of the seal the stress induced in the bias spring will be the same as that induced in the leaf spring where the leaf spring and the bias spring have the same section modulus per unit length of seal.

A yet further alternative form of seal for a gas isolator is described in PCT patent application no. PCT/GB89/01382 (publication no. WO 90/06460), which provides a seal for a gas isolator which comprises a cantilever leaf spring to be attached to a fixed frame or a movable member of the isolator, and a bias spring acting on the leaf spring, wherein the seal is given an initial curvature corresponding to an initial deflection of 10% to 90% of the final free deflection, preferably 25% to 75% thereof, more preferably 40% to 60% thereof.

The present invention is particularly concerned with an improvement in or modification of a seal of the type according to GB-2060824, but is also applicable to a seal of the type according to GB-1308801 or PCT/GB89/01382.

The present invention provides a seal for a gas isolator which comprises a cantilever leaf spring to be attached to a component of the isolator selected from a fixed frame or a movable member of the isolator, and a bias spring acting on the leaf spring, and a bar disposed below the seal for clamping and supporting the latter, characterized by at least one additional damping element which will usually comprise a further leaf spring, and characterized in that the clamping/support bar is of reduced width.

The additional damping element will usually comprise a leaf spring of the same material and thickness as the cantilever leaf spring, but will usually be somewhat narrower (i.e. shorter) than the seal element comprised by the cantilever leaf spring. The additional damping element will usually be clamped between the cantilever leaf spring and the fixed frame or movable member, and be given an initial curvature wherein however the radius of curvature thereof is less than that of the cantilever leaf spring.

Usually a seal according to the invention will include only a single additional damping element, but a corner seal may suitably include two (or more) superimposed additional damping elements in order to counter increased vibration at the isolator corners, as will be further described below.

The present invention thus provides a seal characterized by at least one additional damping element and a modified element side clamping/support bar of reduced width. In this case the damping function is provided by both the damping element and the clamping/support bar.

The clamping/support bar is reduced in width so that it extends beyond the edge of the movable member (blade) or frame member to which the seal is clamped by a reduced amount compared with the prior art. In an extreme case it could be reduced to such an extent that it does not protrude beyond the blade or frame member edge to which it is clamped. The clamping bar is preferably flat in form, and in the case where it extends beyond the blade or frame member to which it is clamped accordingly produces an interference between it and the seal element/damping element assembly comprised by the cantilever leaf spring and the additional damping spring.

Usually a bias spring clamping bar will be provided to clamp the bias spring, the bias spring clamping bar being located on the opposite side of the movable member or frame member from the clamping/support bar, and the clamping/support bar will usually be of a width less than the width of the bias spring clamping bar.

The damping effect is enhanced by the additional damping element fitted to the same side of the blade or frame member as the sealing element itself, between the seal element and the blade or frame member. This damping element would be typically but not necessarily of the same thickness as the seal element, and somewhat narrower than the seal element. By transferring part of the damping function to this damping element between the seal element and the blade or frame member allows the side clamping/support bar to be reduced in width so that a much greater part of the full span width of the seal may be used to accommodate thermal expansion. Sufficient clearance needs to be provided to take account of manufacturing tolerances in the members.

The seal element is preferably given an initial curvature generally as in the embodiment described in GB-2060824. The additional damping element is also given an initial curvature but of a somewhat smaller radius than the seal element. This ensures that, when the assembly is mounted on the blade or frame member, the two seal components form an interference fit so that there is a mutual contact force between the seal element and the damping element.

The bias spring and a bias spring side clamping bar takes generally the form of that used in the above mentioned prior art. There is a small contact force where the bias spring contacts the cantilever leaf spring when the system is in the free position.

The damping occurs for two reasons. The fact that the free length of the damping element is not the same as that of the seal element means that the natural frequencies of vibration of the two components are dissimilar, so that they cannot vibrate as individual members, but are constrained to vibrate as a pair having a much higher frequency. In addition the interference of the two seal components when assembled causes a frictional force between the two elements. These mechanisms inhibit the tendency of the seal to flutter.

At a corner seal, two seals respectively extending along perpendicular edges of the fixed frame or movable member are usually mitered together at an angle of approximately 45°. In corner seals according to the present invention it is preferable to provide two (or more) additional damping elements directly superimposed one on the other, in order to reduce or eliminate increased vibration at such corners.

The seal according to the invention may be provided with a second bias spring acting on the cantilever leaf spring, in the manner described in U.S. Pat. No. 5,099,886 corresponding to PCT patent application no. PCT/GB 89/00975 (publication no. WO 90/02279), wherein a second similar, but not identical, bias spring acts on the leaf spring, and in which preferably the free ends of the two bias springs act on the leaf spring at substantially the same point, and in which each bias spring has a first limb which is clamped and a second limb which subtends an obtuse angle to the first limb. This will in particular be the case where the seal according to the invention is a corner seal provided with two additional damping elements as described above, but a seal of the invention provided with a second bias spring may also be utilized at non-corner seals under some circumstances.

Usually the tip of the bias spring forms virtually a line contact between itself and the surface of the cantilever leaf spring comprising the sealing element. In the event that the assembled seal vibrates, there is a possibility that wear of the sealing element could occur over a narrow band corresponding to the amplitude of vibration.

In an alternative embodiment, therefore, the bias spring may be bent at a location a short distance from the outer end of the bias spring such that, in the free position of the assembled seal, a short length of the bias spring lies flat on the cantilever leaf spring. This has the effect that, for a given contact force, the bearing pressure between the bias spring and the seal surface is much reduced. If any vibration of the assembly occurs the rate of any wear would be much reduced. In a modification of this alternative embodiment, to reduce the possibility of wear at the seal tip, a short lip may be formed at the outer end of the bias spring, such a lip being slightly curved to give a smooth contact surface between the seal and the bias spring.

The invention will be further described, by way of example only, with reference to the accompanying drawings, wherein.

In the drawings, like reference numerals indicate like parts.

Figure 1:
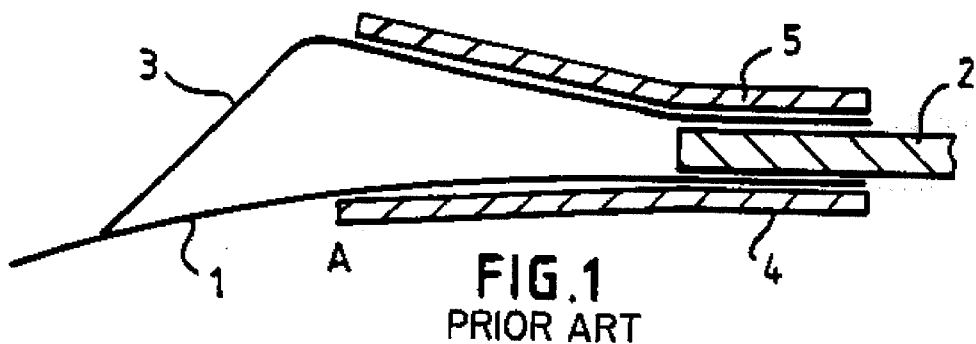
FIG. 1 is a side view of a known type of seal, according to GB-2060824, in the free (non-sealing) position thereof.
Figure 2:
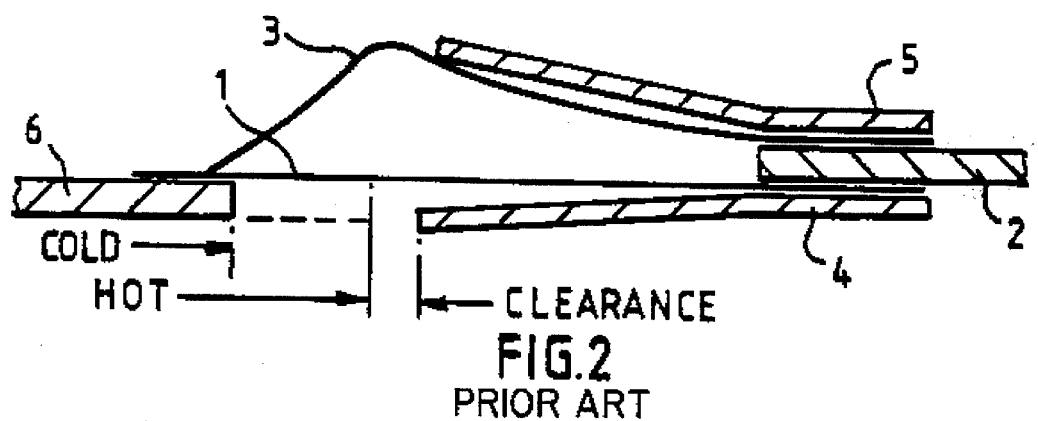
FIG. 2 is a side view of the seal shown in FIG. 1, in the sealing position thereof.

The known seal shown in FIGS. 1 and 2 comprises a cantilever leaf spring 1 attached to a fixed frame member or to a movable member (blade) 2 of an isolator, and a bias spring 3 acting on the leaf spring 1. A bar 4 is disposed below the seal for clamping and supporting the latter, and a bias spring clamping bar 5 clamps the bias spring 3 as shown. The clamping/support bar 4 is in contact with the leaf spring 1 at the point A as shown in FIG. 1.

Such a seal is of the type according to GB-2060824, wherein in the non-sealing position of the seal as shown in FIG. 1 the bias spring 3 makes only touch contact with the leaf spring 1 so that the leaf spring is unstressed in the non-sealing position, while in the sealing position of the seal as shown in FIG. 2 the stress induced in the bias spring will be the same as that induced in the leaf spring where the leaf spring and the bias spring have the same section modulus per unit width.

As shown in FIG. 2, the seal bears against a landing bar (seating) 6 which will comprise a movable member or frame member of the isolator opposite to the frame member or movable member 2. As indicated in FIG. 2, the clearance between the bars 4 and 6 will be greater or lesser in the cold and hot states respectively of the seal. The amount of such differential expansion which can be accommodated and thus limited by the width of the clamping/support bar 4.

Figure 3:
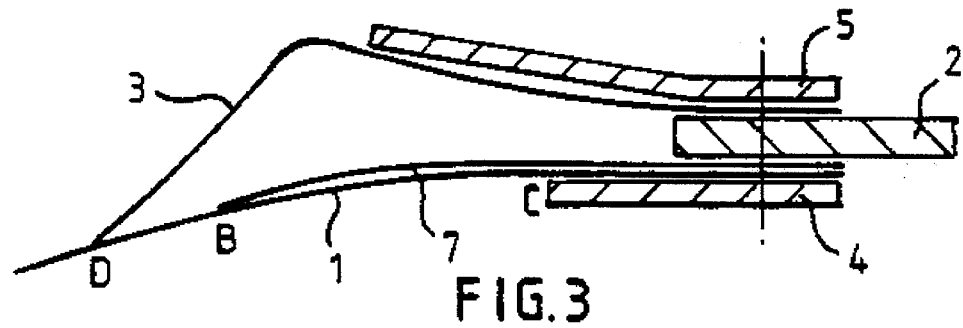
FIG. 3 is a side view of a seal according to the present invention, in the free (non-sealing) position thereof.
Figure 4:
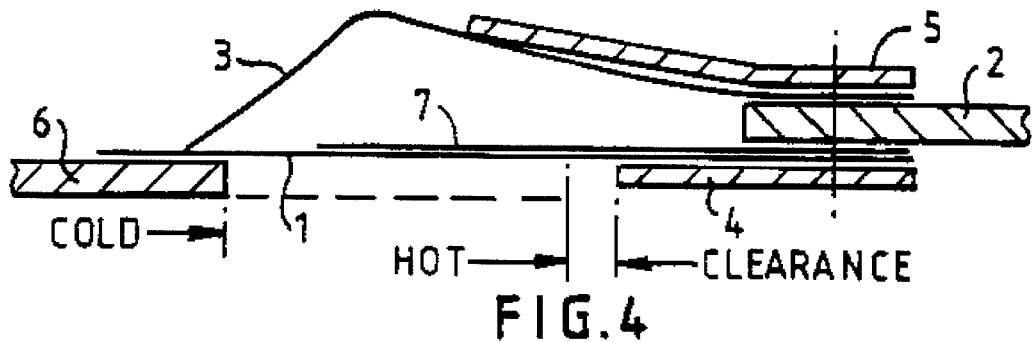
FIG. 4 is a side view of the seal shown in FIG. 3, in the sealing position thereof.

In the seal according to the invention as shown in FIGS. 3 and 4, wherein like reference numerals indicate like parts as in FIGS. 1 and 2, the side clamping/support bar 4 is reduced in width so that it extends beyond the edge of the isolator component, i.e., the blade or frame member 2, to which the seal is clamped by a reduced amount as compared with the bar 4 of the known seal of FIGS. 1 and 2. Also, the clamping/support bar 4 will have a width less than the width of the bias spring clamping bar 5.

The bar 4 is flat in form and extends beyond the blade or frame member 2 to which it is clamped and accordingly produces an interference at a point C in FIG. 3 between it and a seal assembly comprised by the seal element 1 and an additional damping element 7 which is described in more detail below. Because of the curve of the seal there will be some interaction between the seal and the bar 4 at the point C, depending upon the length of the bar 4.

The additional damping element 7 comprises a further leaf spring which is fitted between the seal element comprised by the cantilever leaf spring 1 and the blade or frame member 2, as shown in FIGS. 3 and 4. The additional damping element 7 is preferably of the same thickness as the seal element 1, and is narrower (shorter) than the seal element. By virtue of the enhanced damping effect produced by the element 7, the clamping/support bar 4 can be reduced in width as compared to the known structure of FIGS. 1 and 2, so that a much greater part of the full span width of the seal can be used to accommodate thermal expansion.

The seal element comprised by the cantilever leaf spring in the embodiment of FIGS. 3 and 4 is given an initial curvature generally as in the prior art structure according to GB-2060824 and shown in FIGS. 1 and 2.

Figure 5:
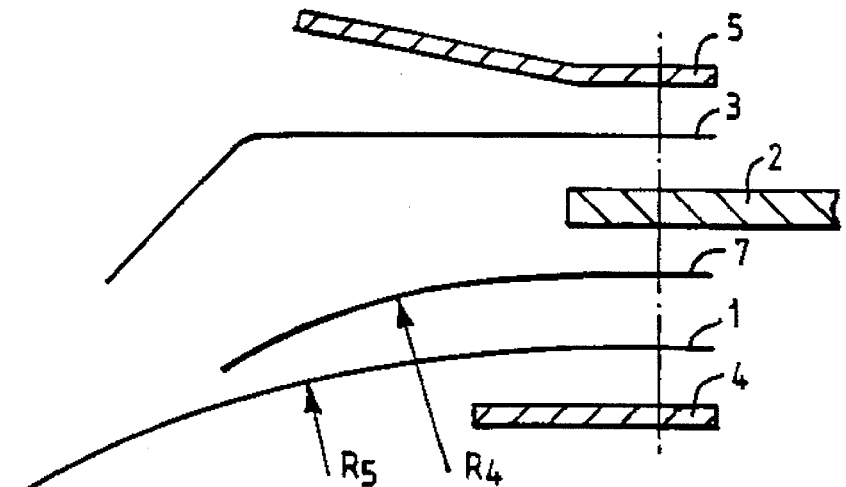
FIG. 5 is an exploded side view of the seal shown in FIGS. 3 and 4.

The additional damping element comprised by the leaf spring 7 is also given an initial curvature but of somewhat smaller radius than the seal element 1. As shown more particularly in FIG. 5, the free radius of curvature $R_4$ of the damping element 7 is less than the free radius of curvature $R_5$ of the seal element 1. This ensures that when the seal assembly is mounted on the blade or frame member then the two components 1 and 7 form an interference fit so that there is a mutual contact force between the seal element 1 and the damping element 7 at a point B where the free end of the damping element 7 bears against the seal element 1 (see FIG. 3). That is, the seal element 1 and the damping element 7 will be equally stressed, where they are of the same material and have the same thickness.

The bias spring 3 and the bias spring clamping bar 5 are generally as in the known construction shown in FIGS. 1 and 2. There is a small contact force at a point D where the bias spring 3 contacts the seal element comprised by the cantilever leaf spring 1, when the seal is in the free position.

As described previously, the damping occurs for two reasons. Firstly, the fact that the free length of the damping element 7 is not the same as that of the seal element 1 means that the natural frequencies of vibration of the two components are dissimilar, so that they cannot vibrate as individual members, but are constrained to vibrate as a pair having a much higher frequency. In addition, the interference of the two seal components when assembled causes a frictional force between the two components. These mechanisms inhibit the tendency of the seal to flutter.

Figure 6:
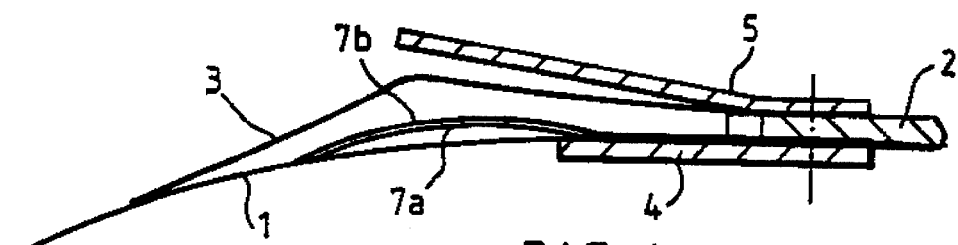
FIG. 6 is a side view of a seal according to the present invention, in the free (non-sealing) position thereof, for sealing at a corner.

The corner seal shown in FIG. 6 is generally similar to that shown in FIGS. 3 and 4, except that the single additional damping element 7 of FIGS. 3 and 4 is replaced by two superimposed additional damping elements 7a and 7b in the embodiment of FIG. 6, which will usually comprise leaf springs as previously described. The two damping elements 7a and 7b are essentially identical and function in a similar manner to the single damping element 7 of the embodiment of FIGS. 3 and 4, but counter the increased vibration which is liable to occur at a corner seal. It has been determined that, by using a corner seal as shown in FIG. 6, no vibration was found to occur up to 100 hz. Although FIG. 6 shows the free ends of the damping elements 7a and 7b acting at substantially the same point, it is alternatively possible to provide damping elements of different length, wherein the end of a shorter damping element 7b acts on a longer damping element 7a.

Figure 7:
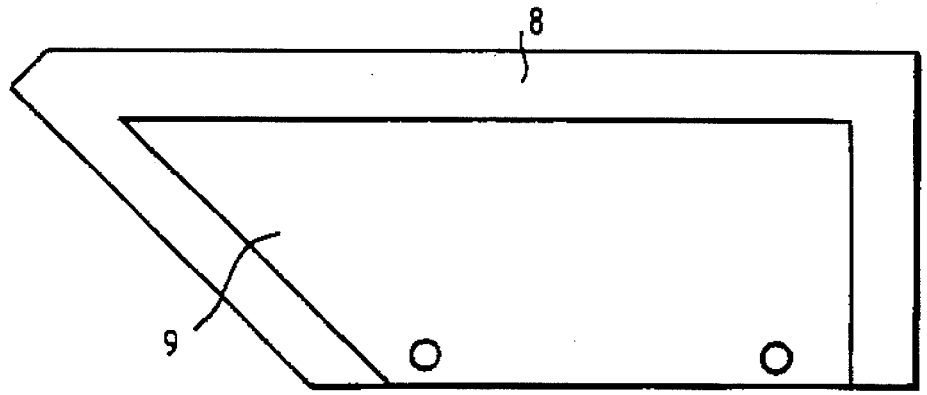
FIG. 7 is a schematic plan view of the seal according to FIG. 6.

FIG. 7 shows schematically a corner seal mitered (at the left hand side of the drawing) at an angle of approximately 45° to fit against a similar corner seal (not shown) extending along a perpendicular edge of the blade or frame member on which the seals are carried. Reference numeral 8 indicates the overlap by the cantilever leaf spring 1 on a landing bar (seating), while reference numeral 9 indicates the area of overlap of the additional damping elements 7a and 7b on the leaf spring 1. The bias spring 3 is omitted from FIG. 7 for reasons of clarity.

The corner seal described above with reference to FIGS. 6 and 7 is preferably (but not necessarily) provided with a second bias spring (not shown) acting on the cantilever leaf spring 1, in the manner described in the above mentioned U.S. Pat. No. 5,099,886 corresponding to PCT patent application no. PCT/GB 89/00975 (publications no. WO 90/02279), wherein a second similar, but not identical, bias spring acts on the leaf spring, and in which preferably the free ends of the two bias springs act on the leaf spring at substantially the same point, and in which each bias spring has a first limb which is clamped and a second limb which subtends an obtuse angle to the first limb.

A seal of the invention provided with such a second bias spring may also be utilized at non-corner seals under some circumstances.

In the various embodiments described above, the tip of the bias spring 3 forms virtually a line contact between itself and the surface of the cantilever leaf spring 1 comprising the sealing element. In the event that the assembled seal vibrates, there is a possibility that wear of the sealing element could occur over a narrow band corresponding to the amplitude of vibration.

Figure 8:
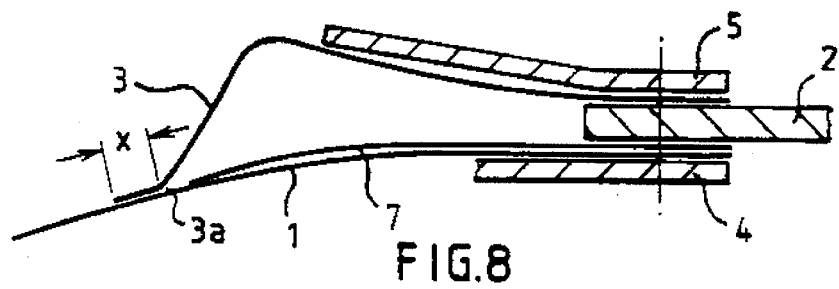
FIG. 8 is a side view of a further embodiment of a seal according to the present invention, in the free (non-sealing) position thereof.

In an alternative embodiment, therefore, as shown in FIG. 8, the bias spring 3 is bent at a location 3a a short distance from the outer end thereof such that, in the free position of the assembled seal, a short length x of the bias spring lies flat on the cantilever leaf spring 1. This has the effect that, for a given contact force, the bearing pressure between the bias spring and the seal surface is much reduced. If any vibration of the assembly occurs the rate of wear would be much reduced.

I claim:

1. A seal for a gas isolator, comprising a cantilever leaf spring to be attached to an isolator component selected from a fixed frame or a movable member of the isolator, a bias spring acting on the cantilever leaf spring, a clamping/support bar disposed below the seal for clamping and supporting the seal, at least one additional damping element which is clamped between the cantilever leaf spring and said isolator component, and a bias spring clamping bar to clamp the bias spring, said bias spring clamping bar being located on the opposite side of said isolator component from the clamping/support bar, and the clamping/support bar being of a width not greater than the width of the bias spring clamping bar.

2. A seal as claimed in claim 1, wherein said additional damping element comprises a further leaf spring.

3. A seal as claimed in claim 1 or 2, wherein said additional damping element comprises a further leaf spring of the same material and thickness as the cantilever leaf spring, and said further leaf spring has a width less than that of the cantilever leaf spring.

4. A seal as claimed in claim 1 or 2, wherein said additional damping element has an initial curvature the radius of curvature ($R_4$) of which is less than the radius of curvature ($R_5$) of the cantilever leaf spring.

5. A seal as claimed in claim 1 or 2, wherein the clamping/support bar extends beyond the edge of said isolator component.

6. A seal as claimed in claim 1 or 2, wherein said at least one additional damping element comprises two superimposed leaf springs.

7. A seal as claimed in claim 1 or 2, wherein the bias spring is bent adjacent the free end thereof so that, in the free position of the assembled seal, the end portion of the bias spring lies flat on the cantilever leaf spring.

* * * * *